United States Patent
Sharma

(12) 
(10) Patent No.: US 6,423,292 B1
(45) Date of Patent: Jul. 23, 2002

(54) ANHYDROUS MAGNESIUM CHLORIDE PREPARATION PROCESS

(76) Inventor: Ram A. Sharma, 2951 Homewood Dr., Troy, MI (US) 48098

(*) Notice: Subject to any disclaimer, the term of this patent is extended or adjusted under 35 U.S.C. 154(b) by 0 days.

(21) Appl. No.: 09/587,739

(22) Filed: Jun. 5, 2000

(51) Int. Cl.[7] .............................. C01F 5/30; C01F 5/32
(52) U.S. Cl. ................ 423/498; 423/497; 423/DIG. 12
(58) Field of Search .................................. 423/498, 497, 423/DIG. 12, 163, 491

(56) References Cited

U.S. PATENT DOCUMENTS

| | | | |
|---|---|---|---|
| 2,384,479 A | | 9/1945 | Lepsoe et al. |
| 2,406,935 A | | 9/1946 | Wood et al. |
| 3,067,006 A | | 12/1962 | Ebert et al. |
| 3,336,107 A | | 8/1967 | Kimberlin |
| 4,083,943 A | | 4/1978 | Kinosz et al. |
| 4,981,674 A | * | 1/1991 | Peacey ........................ 423/498 |
| 5,089,094 A | | 2/1992 | Ogasawara et al. |
| 5,279,716 A | * | 1/1994 | Sharma ......................... 204/70 |
| 5,290,337 A | | 3/1994 | Sharma |
| 5,514,359 A | * | 5/1996 | Sivilotti et al. .............. 423/498 |
| 5,565,080 A | | 10/1996 | Peacey et al. |
| 5,665,220 A | * | 9/1997 | Sharma ....................... 205/359 |

OTHER PUBLICATIONS

McGraw–Hill Encyclopedia of Science & Technology 8th Edition, 1997, (No month).
Kirk–Othmer Encyclopedia of Chemical Technology Second completely revised edition, vol. 17, (No month).
Kirk–Othmer Encyclopedia of Chemical Technology Fourth Edition, vol. 14, (No date).
Rare Earth Specialty Inorganic Chemicals By K.A. Gschneidner, Jr. pp. 403–443, (no date).
The thermal decomposition of yttrium, scandium, and some rare–earth chloride hydrates By Wesley W. Wendlandt pp. 118–122, 1957 (no month).
Thermal decomposition of rare earth chloride hydrates, J. Less–Common Metals, 9 (1964) pp. 1–14; (no month).
The characterization and identification of the rare–earth chloride hydrates by differential thermal analysis By Wesley W. Wendlandt and John L. Bear, 1959 (no month).
The production of separated rare earth compounds for permanent magnets By J.P. Spooner pp. 377–389, No date.
Separation of high purity rare earth on a commercial scale pp. 1–12, No date.

* cited by examiner

*Primary Examiner*—Ngoc-Yen Nguyen
(74) *Attorney, Agent, or Firm*—Reising, Ethington, Barnes, Kisselle, Learman & McCulloch, P.C.

(57) ABSTRACT

Anhydrous $MgCl_2$ is prepared by a) dissolving magnesite in a starting melt of $MgCl_2$—$CeCl_3$ forming $MgCl_2$+CeOCl+$CO_2\uparrow$, b) and converting the CeOCl back to $CeCl_3$ by chlorination with $Cl_2$ in the presence of a reducing agent such as $CO_2$ or $H_2$ to yield a second melt of $MgCl_2$—$CeCl_3$ having a higher concentration of $MgCl_2$. Steps a) and b) are repeated with the second melt to further increase the concentration of $MgCl_2$. The concentrated $MgCl_2$—$CeCl_3$ melt is then reacted with MgO and $Cl_2$ in the absence of a reducing agent to convert the soluble $CeCl_3$ into insoluble $CeO_2$ precipitate which can be separated to yield pure $MgCl_2$.

10 Claims, 2 Drawing Sheets

ANHYDROUS MAGNESIUM CHLORIDE PREPARATION PROCESS

This invention relates to the production of anhydrous magnesium chloride feed material for use in the electrolytic production of magnesium metal.

BACKGROUND OF THE INVENTION

More than seventy percent of magnesium is produced electrolytically using magnesium chloride ($MgCl_2$) as feed material. All of the magnesium production processes are fundamentally similar. They are carried out at about 725° C. using molten salt electrolytes consisting of magnesium chloride, sodium chloride (NaCl), potassium chloride (KCl), calcium chloride ($CaCl_2$) and a small amount of calcium fluoride ($CaF_2$). They differ only in preparation and use of their respective feed material $MgCl_2$.

Fifty percent cost and energy consumption involved in the current production of magnesium is attributed to magnesium chloride feed preparation. Known current processes of magnesium chloride preparation are cumbersome, complicated and very energy intensive. They are as such because magnesium oxide (MgO) is thermodynamically slightly more stable than magnesium chloride at about 1000K and above, making it difficult to prepare magnesium chloride free of magnesium oxide at these temperatures. Anhydrous magnesium chloride free from magnesium oxide is required as feed material for the good performance of the electrolytic magnesium production cells.

It would thus be desirable to provide a less costly process of preparing anhydrous magnesium chloride suitable for use in the electrolytic magnesium production cells without deteriorating their performance. The present invention provides such a process.

Existing Magnesium Chloride Preparation Processes

The existing preparation processes may be divided into two categories:

1. low temperature dehydration processes
2. high temperature chlorination processes.

Magnesium chloride hexahydrate is the starting material in the low temperature dehydration processes. It is prepared from sea water or brine through concentration by removing the excess water or even from magnesite by a chemical process. The hexahydrate is further dehydrated by heating in an appropriate manner and atmosphere to avoid hydrolysis reaction to form magnesium hydro-oxychloride and magnesium oxide. The hydrolysis reaction is also avoided by complexing magnesium chloride with potassium chloride, ammonium chloride or ethylene glycol. These processes are multistage and consume large amounts of energy, and some pose health hazard concerns. None of these known processes are believed to be capable of producing low-cost magnesium chloride.

In the second category of high temperature chlorination processes, magnesium oxide is converted into magnesium chloride by reacting with chlorine at about 800° C. Magnesium oxide is obtained from magnesite by calcination or from brines by usual methods of preparation. Straight chlorination of magnesium oxide with chlorine gas is thermodynamically not spontaneous, therefore, a reducing agent such as coke with magnesium oxide in some cases and carbon monoxide, methane, or ethane, etc. with chlorine in other cases is used to drive the chlorination reaction forward. The thermodynamic barrier in the chlorination process is thus removed by using a reducing agent, but the chlorination reaction is heterogeneous and this heterogeneity of the chlorination process creates a kinetic problem, making the chlorination processes inefficient. The kinetic problem comes because magnesium oxide is insoluble in the chlorination medium. The medium thus becomes a barrier for MgO to come in contact with other reactants necessary to carry the reaction forward. Attempts at solving this problem by stirring the medium have shown to achieve only partial success.

The present invention overcomes the barrier problem by providing a magnesium oxide chlorination process carried out in a salt medium in which magnesium oxide is soluble and thus able to have sufficient contact with the reactants to convert the MgO.

SUMMARY OF THE INVENTION

A method of producing $MgCl_2$ starting material for use in the production of pure magnesium comprises the steps of: a) adding MgO feed material to a starting melt of $MgCl_2$—$CeCl_3$ to yield $MgCl_2$+CeOCl, b) reacting the $MgCl_2$+CeOCl with $Cl_2$ in the presence of a reducing agent to yield a second melt of $MgCl_2$—$CeCl_3$ having a higher $MgCl_2$ concentration than that of the starting melt, c) repeating steps a) and b) with the second melt to further increase the concentration of $MgCl_2$ in the second melt, d) reacting the concentrated second melt of $MgCl_2$—$CeCl_3$ with MgO and $Cl_2$ in the absence of a reducing agent to convert the $CeCl_3$ to $CeO_2$ (s) to yield a melt of pure $MgCl_2$+$CeO_2$ precipitate, and e) separating the $CeO_2$ precipitation from the $MgCl_2$ to yield pure $MgCl_2$.

Thus, according to this simple process, the use of $CeCl_3$ enables the otherwise troublesome MgO to dissolve in the $MgCl_2$—$CeCl_3$ starting melt by readily reacting with the $CeCl_3$ to produce CeOCl and $MgCl_2$, whereupon the CeOCl is converted to insoluble $CeO_2$ from which the $MgCl_2$ can be readily separated to yield pure $MgCl_2$ usable in the electrolytic production of magnesium metal.

The invention has the advantage of offering a simple, cost-effective way to produce $MgCl_2$ for use in the production of Mg metal. As the production of $MgCl_2$ usually constitutes a large share of the cost of manufacturing Mg metal, the process of the invention thus has the further important advantage of lowering the overall cost of producing Mg metal. This, in turn, has the advantage of making Mg a more viable alternative in automotive and other applications as a strong, lightweight candidate material.

BRIEF DESCRIPTION OF THE DRAWINGS

Presently preferred embodiments of the invention are disclosed in the following description and in the accompanying drawings, wherein.

DETAILED DESCRIPTION

Figure 1:
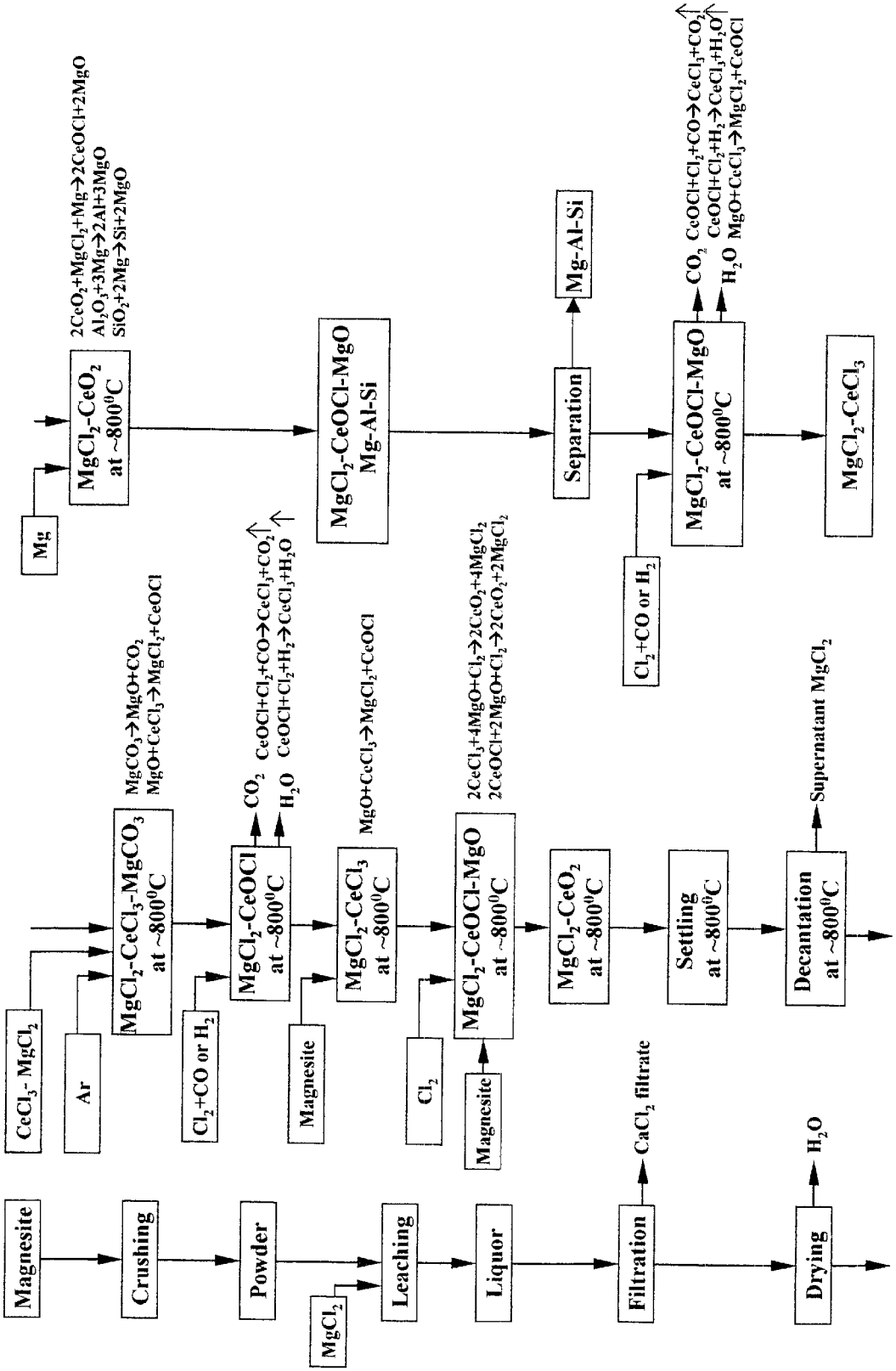
FIG. 1 is a flow diagram of a process according to the invention for preparing magnesium chloride from raw magnesium oxide feed material.

The major impurities which are generally present in magnesium oxide raw material, such as magnesia or calcined magnesite, are calcium oxide (Cao), ferric oxide ($Fe_2O_3$), silica ($SiO_2$) and alumina ($Al_2O_3$). The raw materials should preferentially be freed from these impurities before they are used after being converted into chlorides in the electrolytic cells. The purification process and magnesium chloride preparation process according to the invention is described below.

The standard free energy changes of calcium carbonate ($CaCO_3$) reacting with $MgCl_2$ forming magnesium carbonate ($MgCO_3$) and calcium chloride, and CaO reacting with $MgCl_2$ forming MgO and $CaCl_2$ from room temperature to 1000 K are negative and, therefore, both reactions are spontaneous. The standard free energy change of the former reaction is −37.0 kcal when the standard state of each of $CaCO_3$ and $CaCl_2$ is ideal solution of unit molality and that of $MgCl_2$ and $MgCO_3$ is pure crystalline state. The standard free energy change of the crystalline calcium hydroxide, $Ca(OH)_2$ reaction with crystalline magnesium chloride forming crystalline magnesium hydroxide, $Mg(OH)_2$ and crystalline $CaCl_2$ is −22 kcal at room temperature. The free energy change of this reaction is about −29 kcal when the standard state of $Ca(OH)_2$ is a hypothetical ideal solution of unit molality. The spontaneity of these reactions indicate that magnesite or magnesia may be freed from calcium carbonate or calcia by reacting them with a magnesium chloride solution of a suitable concentration at an appropriate temperature and pressure in an autoclave and washing away the calcium chloride formed.

The reaction $MgO+CeCl_3 \rightarrow CeOCl+MgCl_2$ has negative standard free energy change, and so is spontaneous. CeOCl is appreciably soluble in $MgCl_2$—$CeCl_3$ melts at an appropriate temperature, such as about 800° C.

Considering the phase diagram of the $CeCl_3$—$MgCl_2$ system, $CeCl_3$—$MgCl_2$ melts having 0–80 m/o $CeCl_3$ are molten at about 800° C. When a calculated amount of MgO is added to a $CeCl_3$—$MgCl_2$ melt at about 800° C. containing 80 m/o $CeCl_3$, CeOCl forms by the previously described reaction. The CeOCl formed dissolves in the melt. Accordingly, plenty of MgO can be dissolved in such melts and a melt saturated with CeOCl or having CeOCl in suspension as solid particles can be prepared.

Considering the standard free energy changes of the following reactions:

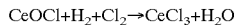

each has a negative standard free energy change at room temperature to 1100 K and therefore is spontaneous. That means CeOCl in a melt of $CeCl_3$—$MgCl_2$—CeOCl described above may be chlorinated with a mixture of $Cl_2$ and $H_2$ or CO to form a $CeCl_3$—$MgCl_2$ melt. As described before, MgO can be dissolved in $MgCl_2$—$CeCl_3$ melt of appropriate composition through forming CeOCl. The CeOCl in the melt can be chlorinated without having any contact problem among the reactants forming a $MgCl_2$ and $CeCl_3$ melt. In this way a melt containing very high concentration of $MgCl_2$ can be prepared.

Considering the standard free energy changes of the reactions:

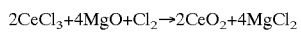

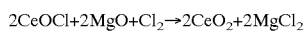

each has a negative standard free energy change over the same temperatures and therefore is spontaneous. Both of these reactions may be carried out forming $CeO_2$ and $MgCl_2$, ultimately.

The final melt so prepared of $MgCl_2$ and insoluble $CeO_2$ may contain insolubles such as $SiO_2$ and $Al_2O_3$ when magnesite feed material is used as the source of MgO. The melt can be kept at molten temperature to allow the insolubles to settle to the bottom of the reaction vessel and then the supernatant $MgCl_2$ can be decanted off and stored in a vessel for further use, such as in an electrochemical cell for preparing Mg metal. In this way very pure $MgCl_2$ can be prepared.

Considering the standard free energy changes of the following reactions:

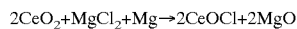

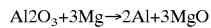

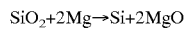

all have negative standard free energy changes and therefore are spontaneous. This means $CeO_2$ may be converted to CeOCl in the melt by reacting with magnesium and then CeOCl can be converted into $CeCl_3$ by reaction with $Cl_2$ in the presence of a reducing agent as described above. The regenerated $MgCl_2$—$CeCl_3$ melt is ready for further use for making $MgCl_2$ from MgO. The impurities $Al_2O_3$ and $SiO_2$ can be converted into Al and Si by the above reactions. They will pass into magnesium and the magnesium containing these impurities can find use in desulphurization of iron, etc.

A flow diagram of the magnesium chloride preparation process according to the invention is shown in FIG. 1. As shown in the diagram, magnesite of appropriate purity is crushed into fine powder. The powder is treated with $MgCl_2$ solution of suitable $MgCl_2$ concentration at an appropriate temperature in an autoclave and then is filtered to remove $CaCl_2$. The filtered magnesite is then washed and dried and added into a starting melt of $MgCl_2$—$CeCl_3$ at about 800° C. having an appropriate concentration of $CeCl_3$. The magnesite decomposes producing MgO and $CO_2$ during adding. The $CO_2$ escapes and MgO reacts with $CeCl_3$ in the melt forming CeOCl and $MgCl_2$. The CeOCl formed may be partly dissolved and partly in suspension.

The $MgCl_2$—CeOCl melt at about 800° C. is then reacted with $Cl_2$ and an appropriate reducing agent, such as $H_2$ or CO to convert the CeOCl in the melt to $CeCl_3$, yielding a second melt of $MgCl_2$—$CeCl_3$ having an increased concentration of $CeCl_3$ as compared to the starting melt of $MgCl_2$—$CeCl_3$. Fresh magnesite can be added to the concentrated second $MgCl_2$—$CeCl_3$ melt and then reacted with $Cl_2$ in the presence of the aforementioned reducing agent(s) to further increase the concentration of $CeCl_3$ in the second melt.

Additional magnesite is added to the concentrated second melt of $MgCl_2$—$CeCl_3$ to form $MgCl_2$—CeOCl-MgO, but then reacted with chlorine in the absence of a reducing agent to convert CeOCl into $CeO_2$. The $CeO_2$, which is insoluble in molten $MgCl_2$ and possibly more than three times as dense as $MgCl_2$, settles together with the impurities such as $Al_2O_3$ and $SiO_2$, etc. to the bottom of the reaction vessel. The supernatant $MgCl_2$ is removed and is ready for use in the electrolyte cell for magnesium metal production. In this way pure anhydrous $MgCl_2$ from natural magnesite is prepared.

The left over $MgCl_2$—$CeO_2$ melt at about 800° C. containing $Al_2O_3$ and $SiO_2$ impurities may be treated with magnesium scrap. $CeO_2$ is converted into CeOCl and the reaction can proceed only up to this stage. Alumina and silica react with magnesium producing aluminum and silicon respectively. These metals pass into scrap magnesium and the magnesium alloy melt so produced can be extracted and used in any other metallurgical process such as desulphurization, etc.

The $MgCl_2$—CeOCl melt so produced can be converted into $MgCl_2$—$CeCl_3$ melt by subjecting to chlorination with chlorine having $H_2$ or CO reducing agent as before. The $MgCl_2$—$CeCl_3$ melt can thus be used repeatedly and pure anhydrous $MgCl_2$ can be produced continuously.

The process is energy efficient, as no dissolution process, evaporation process or heating/cooling cycles are involved. The hot chlorine gas may be used as such from the electrochemical cell for magnesium production. Carbon can be used as a reducing agent in place of $H_2$ and CO if it is found more economical and suitable. $MgCl_2$ and $CeCl_3$ used have no restriction for oxide concentrations. Cerrium used is most abundant among the rare earth metals and not consumed in the process. Therefore, the magnesium chloride preparation process of the invention is comparatively simpler and less expensive than known existing processes.

Cerium, Ce, is unique among the family of rare earth elements in that it has a quadravalent state (+4) which causes it to behave differently when ionized than the other rare earths, which are trivalent. It is the only rare earth that occurs as a quadravalent ion in aqueous solution. Consequently, unlike the other rare earths, its oxide, $CeO_2$, is insoluble in most acids, although it can be dissolved when a reducing agent is present.

The process of the present invention takes advantage of these unique properties of cerium in the production of pure $MgCl_2$. MgO is added to the melt of $MgCl_2$—$CeCl_3$, converting the $CeCl_3$ to CeOCl (cerium oxychloride), which remains in solution. This removes MgO as a barrier to the production of pure $MgCl_2$. The $MgCl_2$—CeOCl melt is then reacted with $Cl_2$ and a reducing agent to convert the CeOCl back to $CeCl_3$ which, because of the reducing agent in the reaction remains in solution with the $MgCl_2$. By repeating the above reactions, the high concentration of $MgCl_2$ can be achieved. Once attained, the unique properties of the cerium enable easy separation of the $CeCl_3$ from the $MgCl_2$. By reacting the concentrated $MgCl_2$—$CeCl_3$ melt with MgO and $Cl_2$, but now in the absence of a reducing agent, the $CeCl_3$ reacts with the MgO and $Cl_2$ to produce $MgCl_2$ and $CeO_2$. $CeO_2$ is insoluble in $MgCl_2$ and can be readily removed as a precipitate or the $MgCl_2$ decanted off.

Magnesium Chloride Dehydration Process

Figure 2:
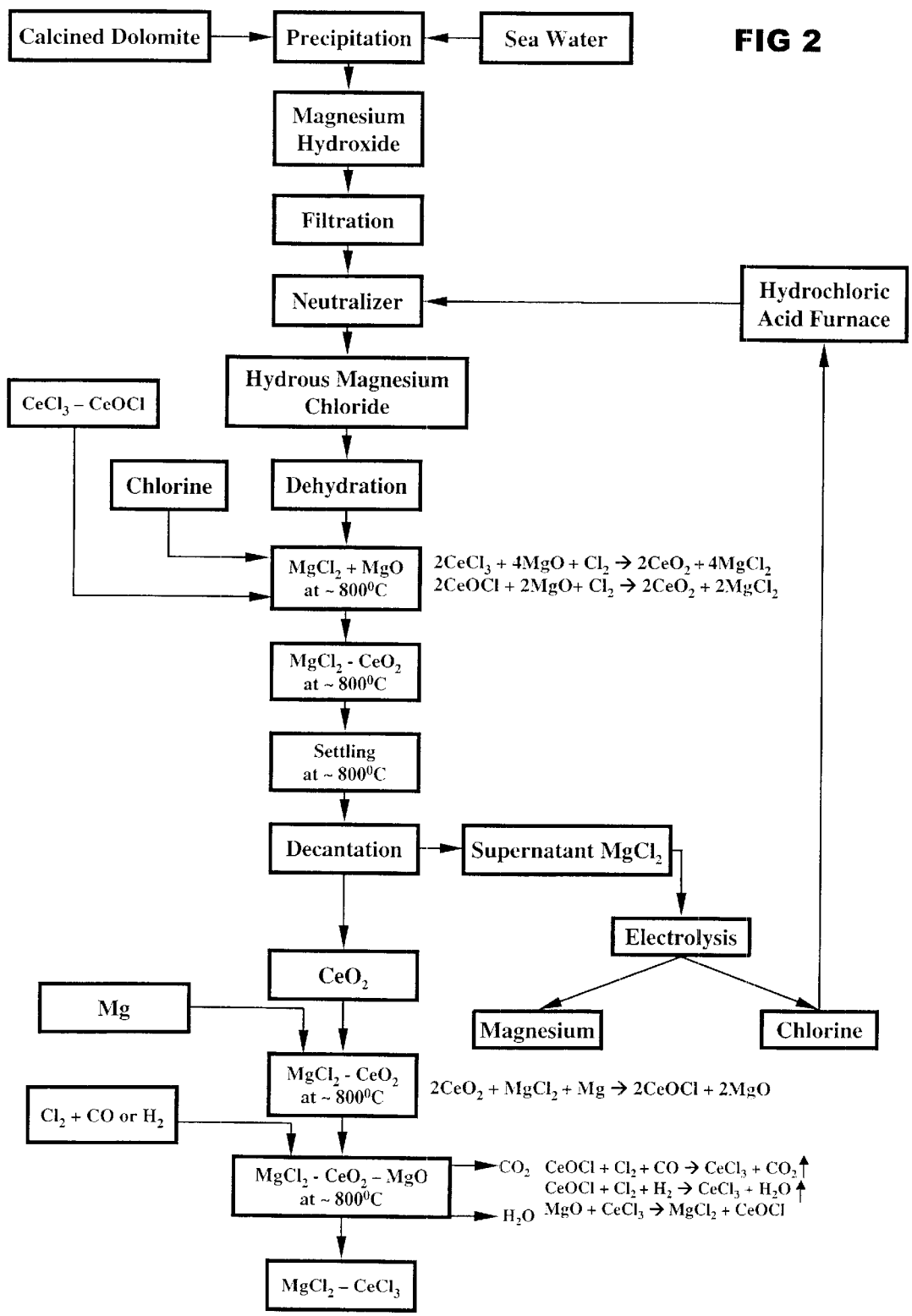
FIG. 2 is a flow diagram of a process according to the invention for producing dehydrated magnesium chloride from hydrated magnesium chloride starting material.

The flow-diagram of a magnesium chloride dehydration process is given in FIG. 2. The hydrated $MgCl_2$ is from the Dow process as an example. It can be from any existing magnesium production process. The hydrated magnesium chloride from the Dow process is dehydrated (i.e., heated to drive off $H_2O$) producing $MgCl_2$—MgO melt. Chlorine is sparged through this melt, and cerrium chloride which may have unrestricted CeOCl (i.e., the $CeCl_3$ need not be 100% pure, but can include some CeOCl) is added into the melt to produce an $MgCl_2$—CeO2 melt based on the above reactions. Further steps in the dehydration process are the same as those in the preparation process, but without the steps of $Al_2O_3$ and $SiO_2$ removal. This simple, inexpensive dehydration process can be used in all magnesium dehydration process to produce inexpensive dehydrated magnesium chloride for use in all magnesium production process.

The disclosed embodiments are representative of presently preferred forms of the invention, but are intended to be illustrative rather than definitive thereof. The invention is defined in the claims.

I claim:

1. A method of preparing pure $MgCl_2$, comprising:
    a) adding MgO to a starting melt of $MgCl_2$—$CeCl_3$ to yield $MgCl_2$+CeOCl;
    b) reacting the $MgCl_2$—CeOCl with $Cl_2$ in the presence of a reducing agent to yield a second melt of $MgCl_2$—$CeCl_3$ having a higher concentration of $MgCl_2$ than that of the starting melt;
    c) repeating steps a) and b) with the second melt of $MgCl_2$—$CeCl_3$ to further increase the concentration of $MgCl_2$ in the second melt of $MgCl_2$—$CeCl_3$;
    d) reacting the concentrated second melt of $MgCl_2$—$CeCl_3$ with MgO and $Cl_2$ in the absence of a reducing agent to convert the $CeCl_3$ to $CeO_2$ (s) and yield a melt of pure $MgCl_2$ and $CeO_2$ precipitate; and
    e) separating the $CeO_2$ precipitate from the $MgCl_2$ melt.

2. The method of claim 1 wherein the separated $CeO_2$ is reacted with $MgCl_2$ and Mg to yield CeOCl and MgO, which is in turn reacted with $Cl_2$ in the presence of a reducing agent of $H_2$, CO or C to yield $MgCl_2$+$CeCl_3$ for further use in step a).

3. The method of claim 1 wherein the MgO is provided by magnesite powder having MgO and impurities including $CaCO_3$, $Al_2O_3$ and $SiO_2$; prior to step a) reacting the magnesite with molten $MgCl_2$ to convert the $CaCO_3$ to $CaCl_2$ and filtering the remaining magnesite material from the $CaCl_2$ and adding the filtered magnesite material to the $MgCl_2$—$CeCl_3$ melt of step a) as the source of MgO.

4. The method of claim 3 wherein the $Al_2O_3$ and $SiO_2$ impurities of the magnesite material are separated out as solids in step e) along with the $CeO_2$.

5. The method of claim 4 wherein the separated $CeO_2$+$Al_2O_3$+$SiO_2$ precipitants of step e) are reacted with $MgCl_2$+Mg to yield $MgCl_2$+CeOCl+Al+Si.

6. The method of claim 5 wherein the reducing agent in step b) is $H_2$, CO or C.

7. The method of claim 1 wherein the reducing agent of step b) is $H_2$.

8. The method of claim 1 wherein the reducing agent of step b) is CO.

9. The method of claim 1 wherein the reducing agent of step b) is C.

10. A method of preparing anhydrous $MgCl_2$ from hydrous $MgCl_2$ starting material, comprising:
    a) dehydrating a melt of hydrous $MgCl_2$ to yield a melt of anhydrous $MgCl_2$+MgO;
    b) removing the MgO from the $MgCl_2$—MgO melt by adding $CeCl_3$ and reacting with $Cl_2$ to yield anhydrous $MgCl_2$+$CeO_2$ precipitate; and
    c) separating the $MgCl_2$ from the $CeO_2$ precipitate to yield substantially pure anhydrous $MgCl_2$.

* * * * *